March 11, 1958 R. CARIGNAN 2,826,754
OIL FAILURE INDICATOR APPARATUS
Filed Sept. 27, 1955 3 Sheets-Sheet 1
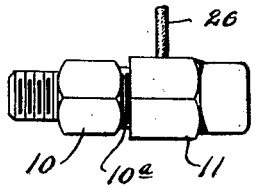
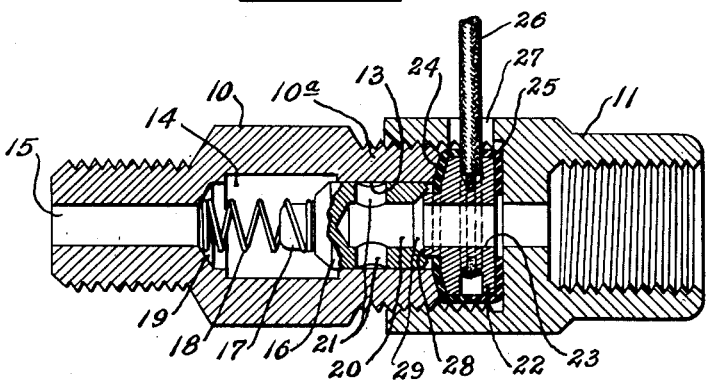
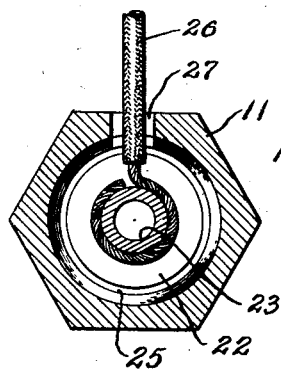
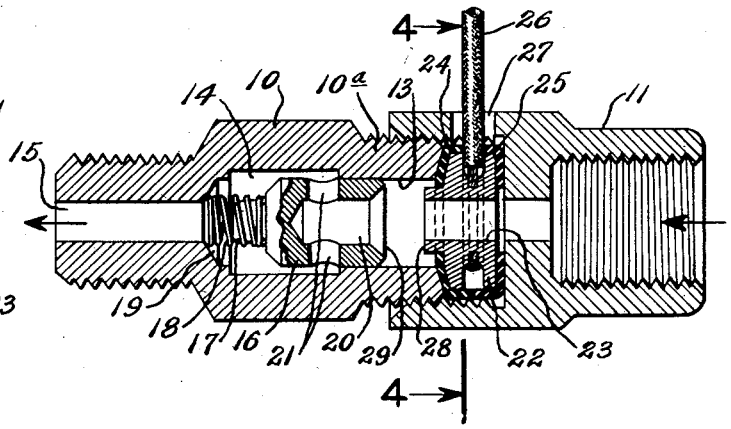
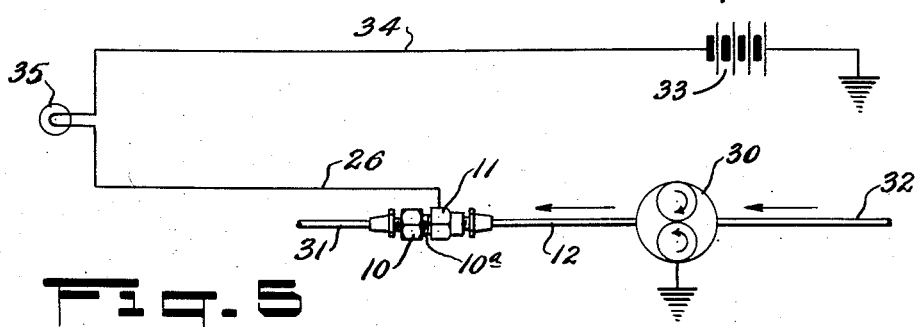
INVENTOR.
RAYMOND CARIGNAN
BY
H. G. Manning
ATTORNEY March 11, 1958 R. CARIGNAN 2,826,754
OIL FAILURE INDICATOR APPARATUS
Filed Sept. 27, 1955 3 Sheets-Sheet 2
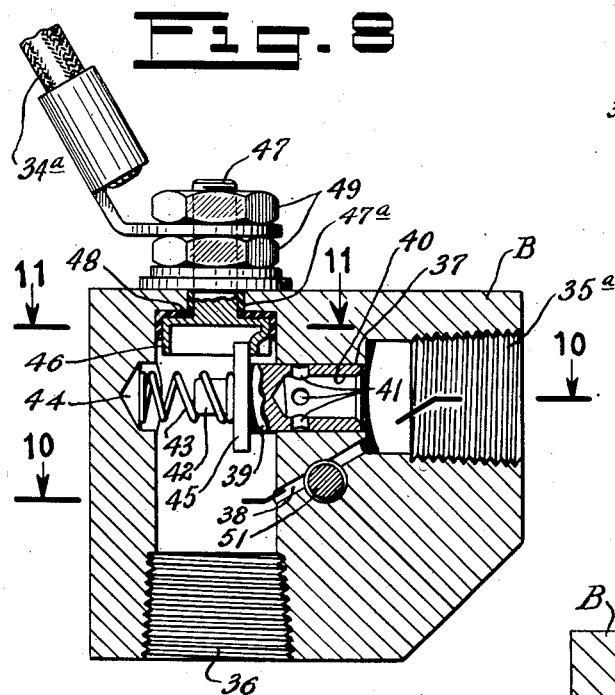
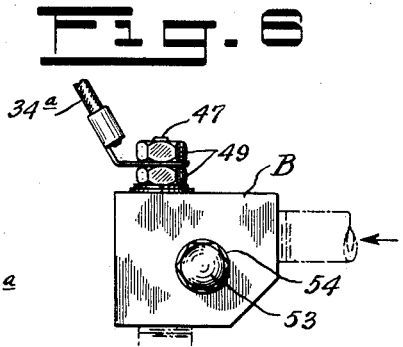
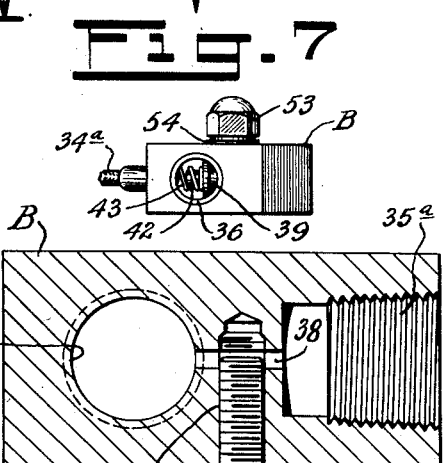
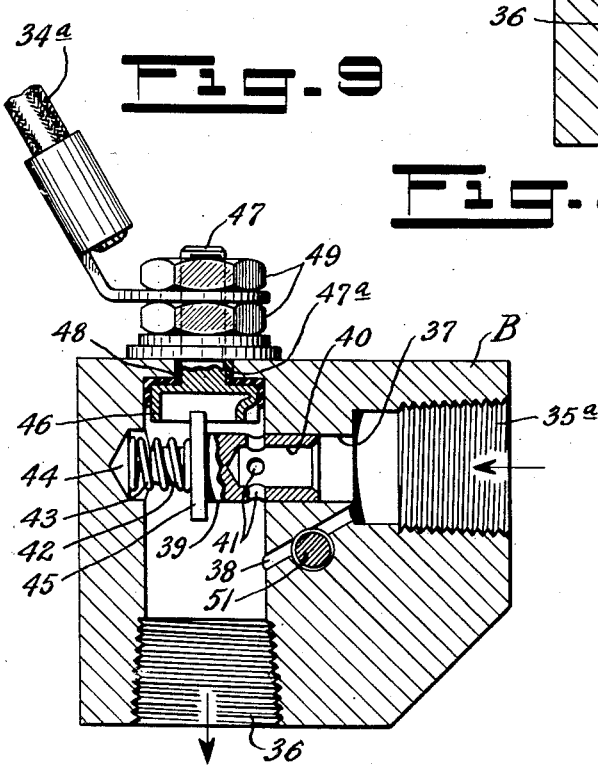
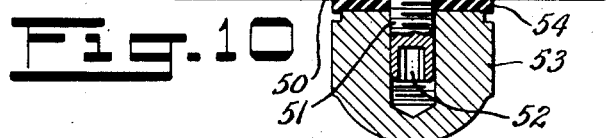
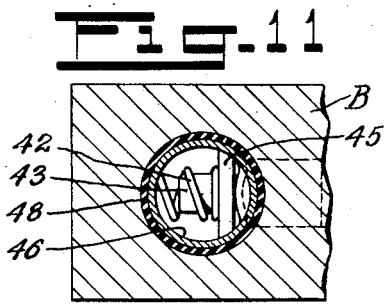
INVENTOR.
RAYMOND CARIGNAN
BY
H. G. Manning
ATTORNEY March 11, 1958 R. CARIGNAN 2,826,754
OIL FAILURE INDICATOR APPARATUS
Filed Sept. 27, 1955 3 Sheets-Sheet 3
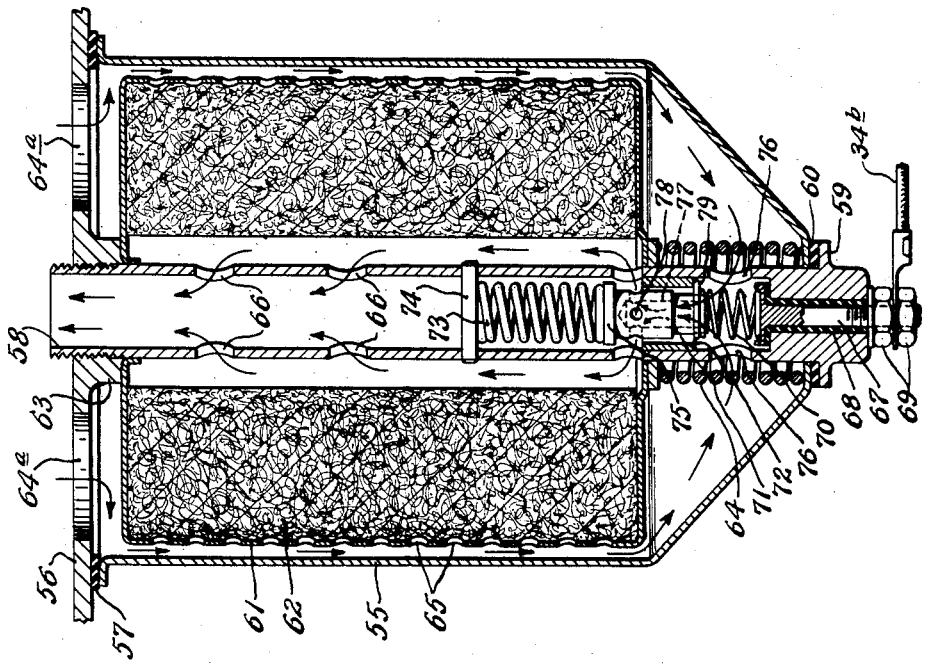
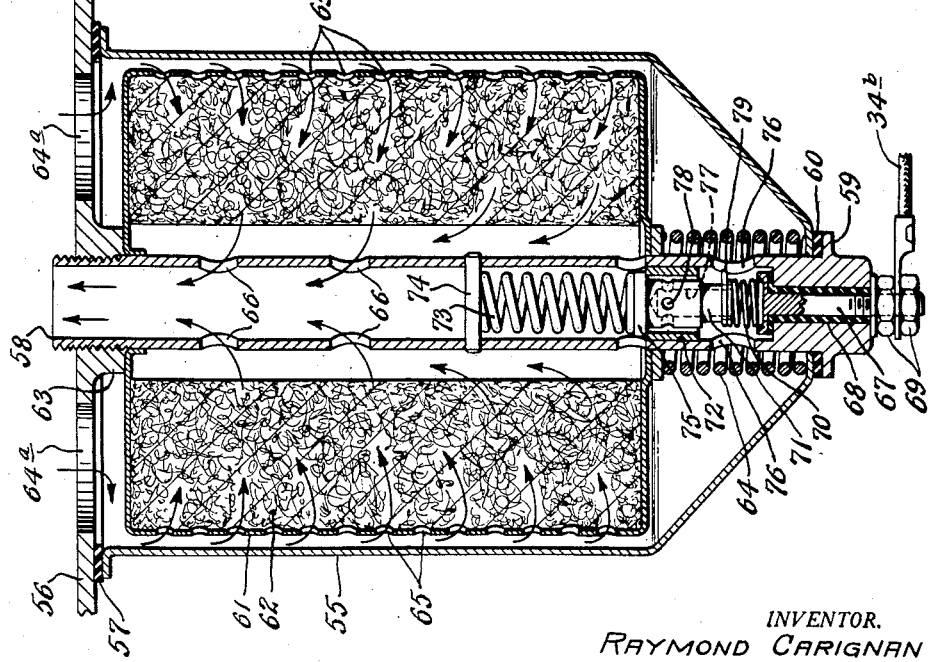
INVENTOR.
RAYMOND CARIGNAN
BY
H. G. Manning
ATTORNEY United States Patent Office 2,826,754
Patented Mar. 11, 1958

2,826,754

OIL FAILURE INDICATOR APPARATUS

Raymond Carignan, Meriden, Conn.

Application September 27, 1955, Serial No. 536,802

3 Claims. (Cl. 340—270)

This invention relates to fluid circulating systems, and more particularly to an automatic apparatus responsive to a change of pressure in an oil circulating system for automobiles, diesel engines, oil burners and the like, whereby a warning such as a signal lamp, a buzzer, or other device will be actuated as a result of a predetermined change in such pressure.

One object of the present invention is to provide an apparatus of the above nature which will give a warning to the driver of a car, in the event that the oil line should become clogged, or the filter cartridge filled with sediment to such an extent as to impede the proper flow of oil.

A further object is to provide an automatic alarm for indicating the failure of an oil supply.

A still further object is to provide an apparatus of the above nature which will be simple in construction, inexpensive to manufacture, easy to install and manipulate, compact, ornamental in appearance, and very efficient and durable in use.

With these and other objects in view, there has been illustrated on the accompanying drawings, three forms in which the invention may conveniently be embodied in practice.

Fig. 1 is a side view of one form of fluid pressure operated switch apparatus, embodying the present invention.

Fig. 2 is a cross-section of the same, on an enlarged scale, showing the switch in closed circuit position.

Fig. 3 is a view, similar to Fig. 2, showing the switch in open circuit condition.

Fig. 4 is a cross-section, taken on the line 4—4 of Fig. 3.

Fig. 5 is a schematic diagram showing the arrangement of the pressure switch in a fluid circulating system, together with an associated electrical circuit.

Fig. 6 is a side view of another form of fluid pressure operated switch apparatus.

Fig. 7 is a bottom view of the same.

Fig. 8 is a cross-sectional elevational view of the same, on an enlarged scale.

Fig. 9 is a view, somewhat similar to Fig. 8, showing the switch in open circuit condition.

Fig. 10 is a cross-section, taken on the line 10—10 of Fig. 8.

Fig. 11 is a fragmentary cross-section, taken on the line 11—11 of Fig. 8.

Fig. 12 is a cross-sectional elevation showing the oil pressure switch apparatus associated with a filtering means, in normal operation.

Fig. 13 is a view similar to Fig. 12, illustrating the appearance of the apparatus when the filter means becomes clogged.

This invention is an improvement on the apparatus disclosed and claimed in the co-pending applicaton of C. H. Genung, Jr. et al., S. N. 449,332, filed August 12, 1954, entitled "Oil Failure Indicator."

FIRST FORM

Referring now to the drawings, in which like reference numerals denote corresponding parts throughout the several views, and more particularly to the first form shown in Figs. 1–4, the numeral 10 indicates a body portion having a threaded end 10a adapted to receive a coupling 11 threadedly connected to a supply line 12 of fluid under pressure. The body 10 is provided at one end with a cylindrical inlet port 13 which communicates with an interior chamber 14 connected with an outlet port 15.

A piston 16 is slidably received in the inlet port 13, and is provided at its forward end with a reduced tip 17 which receives one end of a coil spring 18, the other end of which is seated in a counterbored shoulder 19 which surrounds the outlet port 15.

The piston 16 is provided with an axial bore 20 which extends forwardly from the rear end of said piston and is in communication with a plurality of outwardly extending apertures 21 in said piston.

A disk-shaped contact member 22 of electrically conductive material having an axial passage 23 extending therethrough, is interposed between the end of the body 10 and the coupling 11.

Provision is also made of a pair of yieldable washers 24, 25 of electrically non-conductive material, whereby the contact disk 22 will not only be insulated from the remainder of the device, but will also provide a leak-proof seal for the fluid flowing therethrough.

An insulated wire 26 is connected to the contact disk 22, and is led out through an aperture 27 in the side of the coupling 11. The contact disk 22 is also provided with an annular forwardly-extending portion 28, against which a chamfered portion 29 of the piston 16 seats, in response to the force exerted by the spring 18.

Operation of the first form

In the operation of the apparatus shown in Figs. 1 to 4, fluid under pressure will be furnished from a gear pump 30, as shown in Fig. 5. The outlet 15 of the indicator mechanism is connected to a fluid line 31 leading to a device, not shown, to which the fluid under pressure is delivered, said fluid being supplied to the gear pump 30 through a line 32.

The electrical circuit includes a battery 33, one side of which is grounded, as shown—the other side leading through a wire 34 to a signal lamp 35 connected by a wire 26 to the insulated disk contact 22.

The fluid from the line 12 enters the inlet port 13 and is admitted to the axial bore 20 in the piston 16. Since the only outlet from this bore is through the radial passages 21, so long as these passages are located within the bore 20, fluid cannot pass through the interior chamber 14 to the outlet port 15.

However, whenever sufficient pressure is built up by the pump 30, the resistance of the spring 18 will be overcome, and the piston 16 will move towards the left (as shown in Fig. 3), until the radial passages 21 enter the interior chamber 14. Since this chamber is of greater diameter than that of the bore 20, fluid will then pass outwardly through the passages 21 into the chamber 14 and thence through the outlet port 15.

It will be understood that so long as sufficient pressure exists in the line 12 to overcome the resistance of the spring 18, no current can flow from the battery 33 to the lamp 35, inasmuch as the contact disk 22 is normally insulated by the washers 24, 25 which are connected to the grounded side of the battery.

However, if the pressure in the line 12 should fall below the value necessary to maintain the piston 16 in the position shown in Fig. 3, or if for any reason there should be a stoppage in the line 31, the spring 18 will return said piston towards the right until the chamfered portion surrounding the axial bore 20 engages with the annular portion 28 of the contact 22, which will complete the circuit for lighting the lamp 35, or actuating any other type of warning device which may be in the circuit.

SECOND FORM

In the modified form of indicator apparatus, as shown in Figs. 6 through 11, a by-pass is provided, so that the signal circuit will be closed wherever the fluid pressure falls below a predetermined minimum.

In this modification, a body B is provided with an inlet port 35a and an outlet port 36, disposed generally at right angles to each other, and connected by a cylindrical bore 37 and a somewhat smaller by-pass passage 38.

A piston 39 is slidably received in the bore 37, and said piston has an axial bore 40 extending part way through its interior and being connected to the exterior by means of radial passages 41.

The closed end of the piston 39 is provided with a reduced tip 42 embraced by one end of a coil spring 43, the other end of which is seated in a cavity 44, provided in the side of the outlet 36.

The piston 39 is also provided with a radially extending intermediate flange 45. Moreover, extending downwardly into the upper end of the outlet port 36, is a cup-shaped contact member 46 having a threaded upper stem 47 which projects outwardly of the body B through an opening 47a, and is electrically insulated therefrom by means of a bushing 48 composed of non-conducting material.

The stem 46 is secured in place by means of a pair of nuts 49, which also serve to make an electrical connection with the wire 34a.

A threaded bore 50 extends inwardly from the interior of one side of the body B sufficiently to intersect the by-pass passage 38. A threaded stud 51 is mounted in the body B for adjustably regulating the flow of fluid through the passage 38. The stud 51 is provided with a recessed head portion 52 to receive a suitable tool for rotating said stud to move it transversely in and out of the passage 38. A cap nut 53 is secured on the projecting end of the stud 51 and may be tightened upon a gasket 54 to prevent leakage of fluid from the by-pass passage 38.

*Operation of the second form*

In the operation of the device shown in Figs. 6 through 11, when fluid under pressure enters the port 35a, it will be admitted to the axial passage 40 in the piston 39, and a certain proportion of said fluid will flow into the by-pass passage 38, and as long as the stud 51 does not completely close this passage, the fluid will flow into the outlet 36.

The pressure of fluid in the axial bore 40 of the piston 39 will be resisted by the spring 43, and so long as this pressure is insufficient to move the piston to the left, as shown in Fig. 8, electrical contact will be established between the radial flange 45 and the cup-shaped contact 46, and a circuit will be established through an alarm device by the wire 34a and a common ground.

However, if the pressure of fluid entering the port 35 is sufficient to overcome the spring 43, the piston 39 will be moved toward the left as shown in Fig. 9, thus breaking the contact between the flange 45 and the cup 46 and permitting the fluid to flow outwardly through the radial passages 41 into the outlet 36.

Thereafter, if the pressure is reduced, or if there is a stoppage in the line leading from the port 36, the spring 43 will move the piston 39 toward the right to cut off flow through the radial passages 41, and to reestablish contact between the flange 45 and the cup 46 to actuate a suitable alarm or other warning device. The fluid will still pass from the inlet 35a to the outlet 36 through the by-pass passage 38, the amount of which flow can be regulated by turning the stud 51. This adjustment can be made if the cap nut 53 is removed and a suitable tool is inserted into the recessed head 52, of said nut, which may thus be replaced and turned tightly against the gasket 54.

THIRD FORM

Still another modification of the oil failure indicator mechanism is shown in Figs. 12 and 13, wherein the switch device is combined with a filtering means such as is commonly used for filtering oil supplied to the burner of a furnace, or for lubricating internal combustion engines, and the like.

In this modification, the apparatus is contained within a cylindrical casing 55, which is open at the top and provided with a conically shaped bottom. A removable cover 56, provided with a gasket 57, is held in place by a central outlet tube 58, which is provided with a flange 59 at its lower end, and extends upwardly through a suitable opening in the bottom of the casing 55, this opening being sealed by means of a gasket 60, the upper end of the tube 58 being threadedly received in a central opening in the cover 56.

The filtering element comprises a cylindrical cartridge 61 containing a filtering medium 62, such as felt, fiber glass, or the like, disposed in a thick layer surrounding a central passage through which the outlet tube 58 extends. Such cartridges are well known in the art and form no part of this invention.

The underside of the cover 56 is provided with a downwardly extending central boss 63 against which the top of the cartridge 61 abuts, due to pressure exerted upwardly against the bottom of the cartridge 61 by a spring 64, the lower end of which is seated in the bottom of the casing 55.

During normal use of the device, oil enters through one or more inlet ports 64a provided in the cover 56, and passes downwardly between the wall of the casing 55 and the outside of the cartridge 61, where it will be admitted to the filtering medium 62 through the perforations 65.

The oil moves inwardly through the filtering medium 62 until it reaches the outlet tube 58, to which it is admitted through a number of openings 66 provided therein.

A metallic stud 67 extends through the bottom of the outlet tube 58 and is insulated therefrom by a sleeve 68 of non-conducting material. A wire 34b leading from a signalling or alarm device is connected to the metallic stud 67 by nuts 69.

A coil spring 70 is seated at its lower end in the cup-shaped head of the stud 67, and at its upper end bears against the bottom of the plunger 71, which is formed of some electrically non-conductive material, such as plastic.

The plunger 71 is slidable in a cylindrical sleeve 72 located in the outlet tube 58 at a point below the bottom of the filter cartridge 61.

A coil spring 73 bears against the top of the plunger 71 and is held under compression by a pin 74 which is inserted transversely through suitable apertures provided in the outlet tube 58.

The spring 73 is designed to exert somewhat more force than the lower spring 70, so that under conditions where no pressure exists on the bottom of the plunger 71, it will be urged downwardly against a radially extending flange 75 provided at its upper end. The outlet tube 58 is also provided with one or more openings 76 located below the plunger 71, so that the fluid which enters the casing 55 and flows downwardly below the cartridge 61, will also be admitted to the interior of the outlet tube 58 below the plunger 71.

The plunger 71 is also provided with an axial bore 77 extending part way up through its interior, and communicates with radial passages 78.

*Operation of the third form*

In operation, the oil which is admitted to the cover plate 56 through the inlet ports 64a will pass downwardly around the outside of the filter cartridge 61 through the perforations 65 and the filtering medium 62 and return to the outlet 58 through the openings 66 as previously described.

The filtering medium 62 will normally allow the oil to pass through it without any excess of pressure being required, said pressure being insufficient to overcome the downward force of the spring 73.

However, if the filtering medium 62 becomes so clogged with impurities, dirt, etc., that oil cannot readily pass through it, the oil pressure will increase to such an extent that oil beneath the plunger 71, entering the outlet through the openings 76 will force the plunger 71 upwardly, exposing the radial passages 78 and allowing oil to escape from the axial bore 77, and thus upwardly through the outlet tube 58. At the same time, the upward movement of the plunger 71 will permit the outwardly projecting upper end 79 of the spring 70 to come into contact with the sleeve 72 which will establish an electrical circuit between the wire 34b, connected to stud 67, and the common ground established by the outlet tube 58 and an appropriate alarm device connected with the wire 34b.

While the invention has been herein described for use to indicate changes of pressure in a fluid system, it will be understood that it may also be used to indicate changes of vacuum in such a system, within the spirit and scope thereof.

While there have been disclosed in this specification several forms in which the invention may be embodied, it is to be understood that these forms are shown for the purpose of illustration only, and that the invention is not limited to the specific disclosures, but may be modified and embodied in various other equivalent forms without departing from its spirit. In short, the invention includes all the modifications and embodiments coming within the scope of the following claims.

Having thus fully described the invention, what is claimed as new and for which it is desired to secure Letters Patent is:

1. In an automatic low fluid flow indicator, the combination comprising a casing having an inlet port, an outlet chamber, a cylindrical opening in said casing communicating at each end respectively with said inlet port and said outlet chamber, a cylindrical piston slidable in said cylindrical opening, said piston being closed at one end and provided with an interior passage having one end communicating with said inlet port and extending only part way through said piston, said piston having a pair of opposed radial side openings and being movable in one direction to a first position to expose said other end of said interior passage to establish communication for fluid flow from said inlet port to said outlet chamber through said interior passage and side openings, said piston being movable in the reverse direction to a second position to cover the other end of said interior passage within said cylindrical opening to close said interior passage, electrical contact in circuit with means to control an alarm circuit selectively in response to said moving piston, and biasing means to urge movement of said piston in said reverse direction, said piston being movable in said one direction against the force of said biasing means in response to a differential of pressure of a predetermined value established by fluid in said inlet port and said outlet chamber respectively to indicate fluid flow to said interior passage, said biasing means being effective when said pressure differential is less than said predetermined value to move said piston in said reverse direction to close said interior passage to indicate lack of fluid flow through said interior passage.

2. The invention as defined in claim 1, wherein said biasing means includes a coil spring arranged in axial alignment with and bearing against one end of said piston, and said electrical contact means includes a disk-shaped member positioned in said casing and insulated therefrom and positioned axially in alignment with one end of said piston, said disk-shaped member having a passage for fluid extending therethrough.

3. The invention as defined in claim 2, wherein said disk-shaped member is provided with an annular ridge extending toward the piston, said one end of the piston having a chamfered axial bore to abut axially against said ridge.

References Cited in the file of this patent
UNITED STATES PATENTS

| | | |
|---|---|---|
| 2,729,339 | McCoy | Jan. 3, 1956 |
| 2,747,042 | Zimmerman | May 22, 1956 |